March 26, 1963 H. ASTON 3,082,835
WEIGHING MACHINES
Filed Nov. 1, 1961 4 Sheets-Sheet 1

March 26, 1963   H. ASTON   3,082,835
WEIGHING MACHINES

Filed Nov. 1, 1961   4 Sheets-Sheet 2

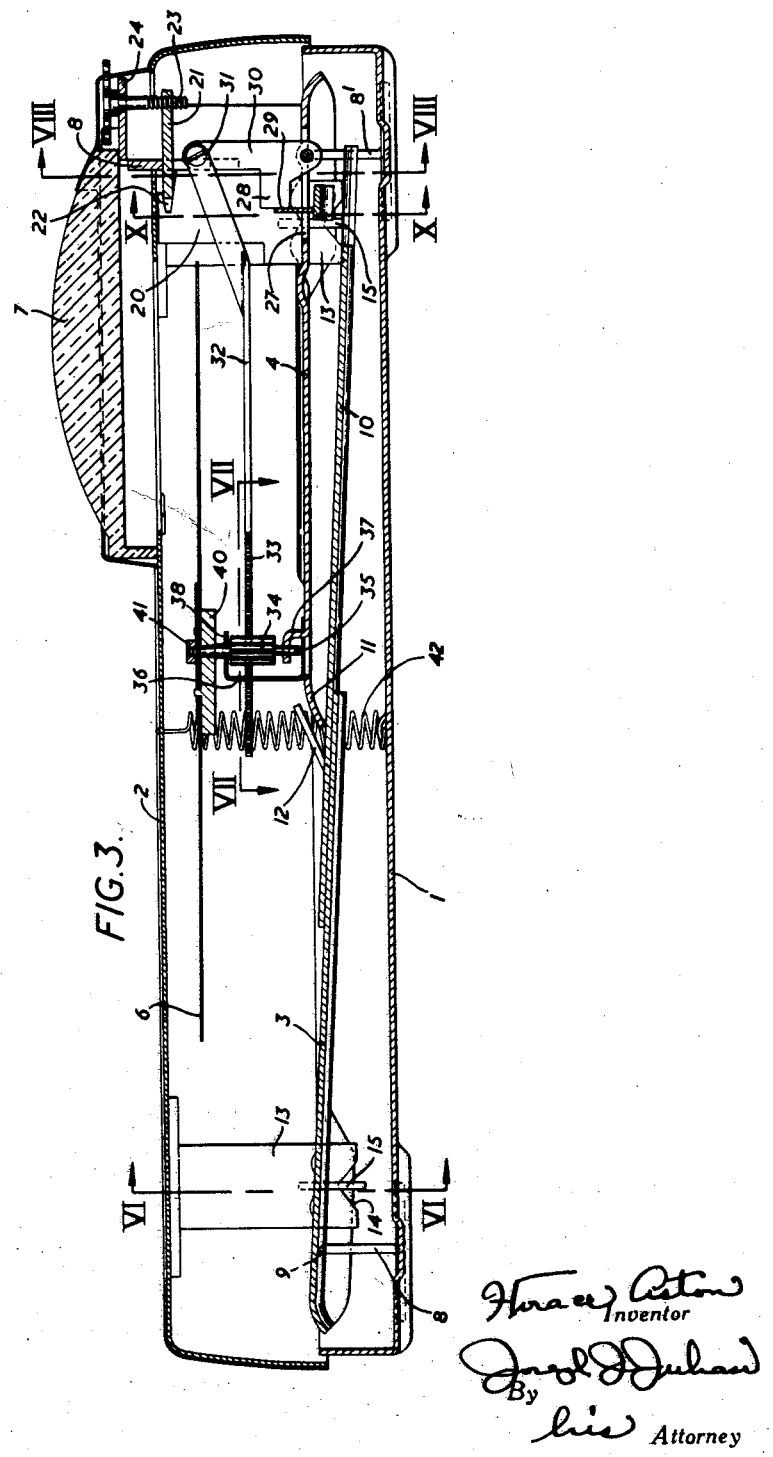

March 26, 1963 H. ASTON 3,082,835
WEIGHING MACHINES
Filed Nov. 1, 1961 4 Sheets-Sheet 4
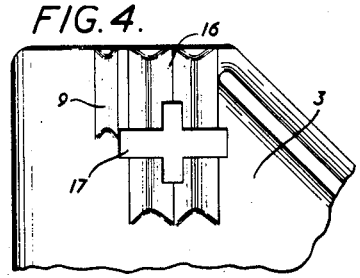
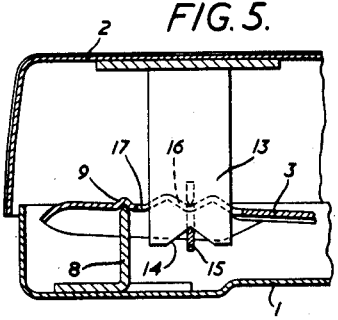
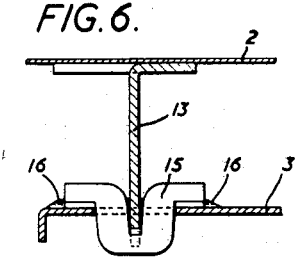
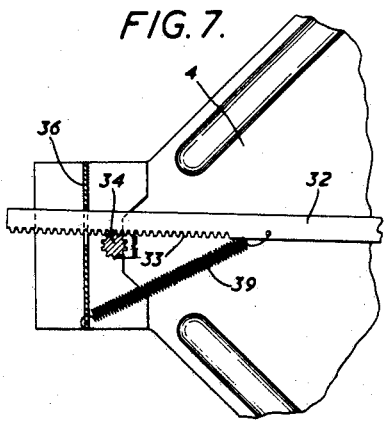
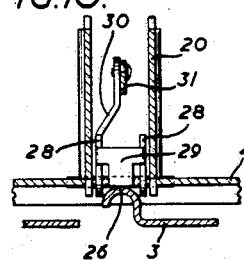
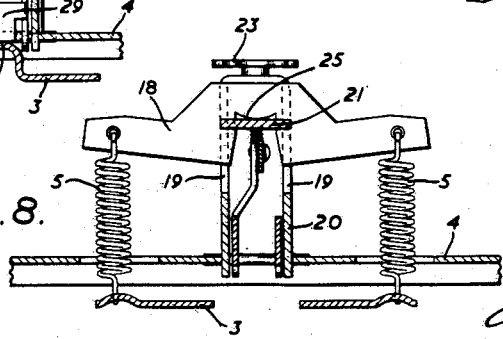

United States Patent Office 3,082,835
Patented Mar. 26, 1963

3,082,835
WEIGHING MACHINES
Horace Aston, 144 High St., West Bromwich, England
Filed Nov. 1, 1961, Ser. No. 149,429
Claims priority, application Great Britain Nov. 3, 1960
5 Claims. (Cl. 177—169)

This invention relates to weighing machines (and more particularly to personal weighing machines) of the kind comprising a platform floatingly supported at or towards opposite ends respectively upon two lever plates fulcrummed on a base with one overlapping the other, so that the load is divided between them; the main or under lever plate being attached to the lower ends of coiled load springs suspended from a bracket, and the movement of said main lever plate under load being transmitted to an angularly movable indicating device (such as a rotating dial or a movable pointer) through rack-and-pinion mechanism.

Heretofore in this type of weighing machine the load-spring bracket and a bracket carrying the pinion have been mounted on a frame separate from the lever plates and attached to the base of the machine, but with this construction the assembly of the parts is not easy and accuracy in weighing cannot always be obtained owing to liability of the base of the machine to distort.

The objects of the present invention are to facilitate the assembly of the parts, to reduce production costs in comparison with conventional machines of the kind referred to, and to ensure greater accuracy in weighing.

According to the invention, in a weighing machine of the kind referred to, the load-spring bracket and the pinion bracket are both carried on one of the lever plates.

FIGURE 1 of the accompanying drawings is a perspective view of the base, with the mechanism contained therein, of a personal weighing machine in accordance with the present invention, the rotating dial being omitted.

FIGURE 3 is a longitudinal section through the machine.

FIGURE 4 is a fragmentary plan view of a corner portion of the lower lever showing the aperture and fulcrum grooves which receive the knife-edge and rocker parts.

FIGURE 5 is a fragmentary section taken in a plane corresponding to line V—V, FIGURE 1, but with the platform assembled.

FIGURE 6 is a section on line VI—VI, FIGURE 3.

FIGURE 7 is a section on line VII—VII, FIGURE 3.

FIGURE 8 is a fragmentary transverse section on line VIII—VIII, FIGURE 3.

FIGURE 10 is a cross-section on line X—X, FIGURE 3.

Figure 1:
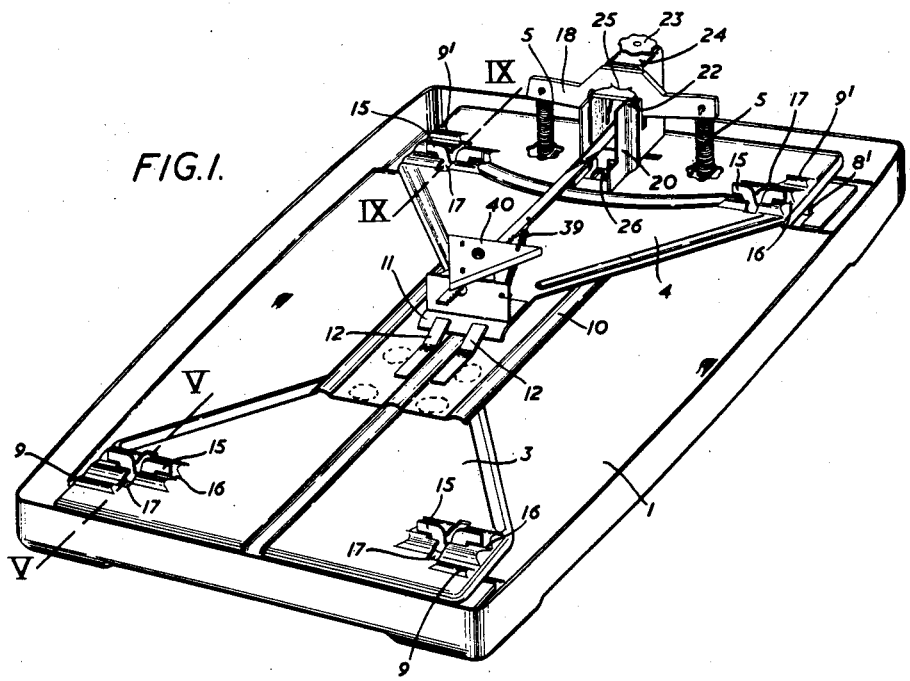
Figure 9:
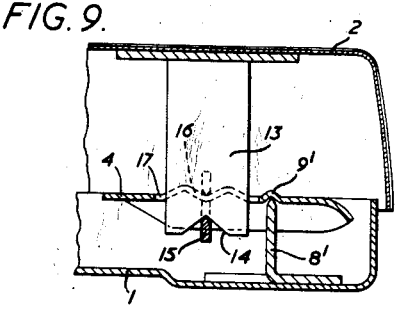
FIGURE 9 is a fragmentary section on line IX—IX, FIGURE 1.
Figure 2:
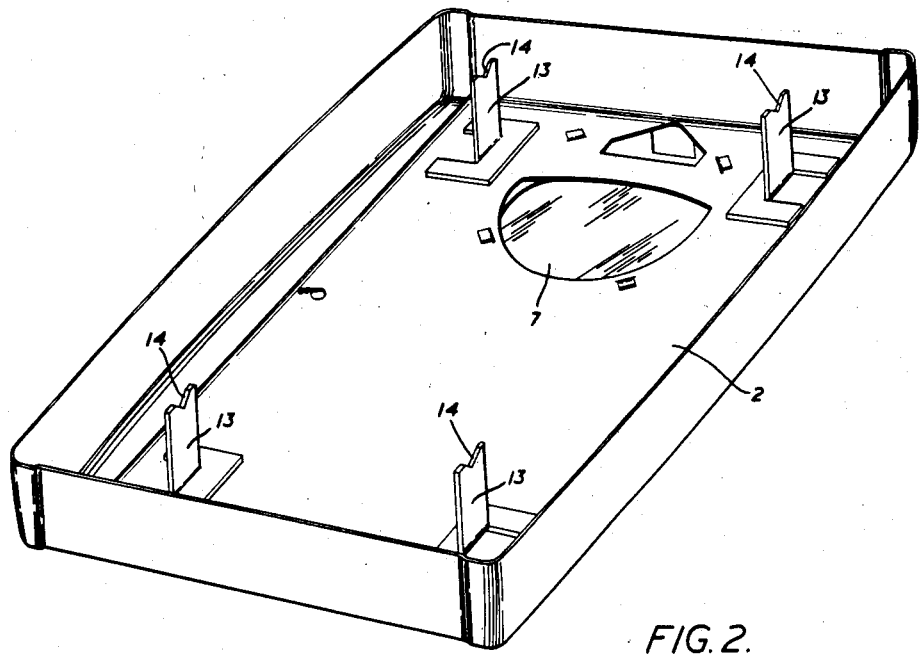
FIGURE 2 is a perspective view of the platform of the machine, shown in an inverted position.
Figure 11:
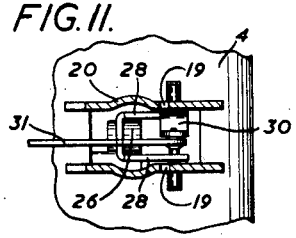
FIGURE 11 is a horizontal section through the load-spring bracket.

Referring to the said drawings, which represent a personal weighing machine constructed according to a convenient embodiment of the invention, the said machine comprises, essentially, a shallow box-like base 1 having side and end flanges, and a platform 2 resting on two overlapping lever plates 3, 4, fulcrummed upon the base 1 and whose movement is resisted by load springs 5, 5, and is transmitted by rack-and-pinion mechanism to a rotatable dial 6 movable, in relation to a fixed pointer (not shown), beneath a lens or window 7 in the platform.

The base 1 has attached to its upper face four upstanding knife-edges 8, 8', two at each end in transverse alignment. Fulcrummed upon the two knife-edges 8 at one end of the base is a main lever plate 3 formed, near one end, with aligned, transverse grooves 9, 9, pressed in it from the underside, for engagement with the said knife-edges 8 at the one end. The portion of this lever plate which is at the fulcrum end is of substantially triangular shape, but it has welded or otherwise attached to it a parallel-sided extension 10 from the apex portion nearly to that end of the base which is remote from the fulcrum points 8, 9, of the said plate 3. Fulcrummed upon the two knife-edges 8' at the other end of the base is a second lever plate 4 of generally triangular shape formed, near its outer end, with aligned transverse grooves 9', 9', pressed in it from the under side, for engagement with the said knife edges 8'. This second lever plate 4 lies over the main lever plate 3 and its apex or nose end is located at about the middle of the machine. A short straight and turned-down transverse edge 11 is provided at said apex or nose end and lies under overlapping retaining tongues 12 on the main lever plate 3.

The platform 1, upon which a person stands whilst being weighed is of inverted box-form with depending flanges, and has fixed upon its under side four depending legs 13 with notches 14 in their lower edges. Two of these legs are located near one end of the platform and two near the other end, and their notched lower ends pass through openings 17 in said plates and seat upon the edges of loose U-shaped rocking pieces 15 (FIGURE 6) rockably supported, by side wings, in transverse grooves 16 provided in the two lever plates 3, 4, at positions displaced by a short distance (in the direction towards the middle of the machine) from the grooves 9, 9', which receive the knife-edges 8, 8'. By this means the load is applied to, and equally divided between, the two lever plates 3, 4, and the lever arm through which the respective load proportions act on the lever plates is the distance between said rocking pieces 15 and the fulcrum knife-edges 8, 8', respectively.

The end of the main lever plate 3 which is remote from the fulcrum (hereinafter called the outer end) is attached to the lower ends of two laterally-spaced vertical coiled tension springs 5, 5, which pass through openings in the upper lever plates 4. These springs are suspended by their upper ends from opposite ends of a transverse beam-like plate 18 engaging slots 19 in opposite spaced-apart sides of a bracket 20 (hereinafter called the load-spring bracket) of inverted U-shape, the lower edges of which are riveted, welded or otherwise secured to the rear portion of the upper lever plate 4, so that the bracket stands upright at the middle of the rear portion thereof. The upper part of the forward portion of the bracket is cut away, leaving only the rear portion of inverted U-shape, and supported upon the side edges thereof is a horizontal plate 21 the forward portion of which engages notches 22 in the sides of bracket 20. This plate 21 has a tapped hole (FIGURE 3) in its rear part engaged by a vertical zero-setting screw 23 passing through a hole in the transverse top portion 24 of the U-shaped part of the bracket 20, so that by turning the screw the said plate may be raised or lowered. The middle portion of the beam-like spring-suspension plate 18 is gapped to straddle said plate 21, and the top of the gap is convexly curved at 25 (FIGURE 8) to rockingly seat upon the plate. Thus, by adjusting the zero-setting screw 23 the latter plate 21 may be raised and lowered, and thereby the beam-like spring suspension plate 18 correspondingly raised or lowered to set the zero reading.

The vertical movement of the outer end of the main lever plate 3 under the effect of the load is transmitted through rack-and-pinion mechanism to a rotatable indicating dial 6 movable beneath the lens or window 7 in the platform of the machine, the weight indication being read against the fixed pointer. Thus, the outer end of the main lever plate 3 has a raised projection 26 situated beneath an aperture 27 in the upper or secondary lever plate 4, and pivoted between the sides of the upstanding load-spring bracket 20 is a bell-crank lever one arm 28 of which carries a transverse bar or stirrup part 29 resting on and co-operating with the said raised projection on the main lever plate. The other arm 30 of the bell-crank lever extends upwardly and is jointed at 31 to one end of a rack bar 32 extending longitudinally towards the forward or nose end of the upper or secondary lever plate. The forward portion of this rack bar is toothed at 33 along one edge to form a rack which engages a toothed pinion 34 carried on a vertical spindle 35 mounted in bearings in bracket parts 36, 37, attached to or formed out of said forward or nose end portion of the upper or secondary lever plate 4. The said bracket parts, herein called "the pinion bracket" may comprise a cranked lug 37 pressed out of the lever plate to constitute a footstep bearing for the lower end of the pinion spindle 35, and an upstanding bracket plate 36 welded to the lever plate and having a bent-over upper lug 38 formed with a bearing aperture for the upper part of the spindle. The rack bar 32 extends through an aperture in the upstanding bracket plate 36 and a coiled horizontal tension spring 39 extends obliquely from one edge of the said plate 36 to the rack bar so as to serve the double purpose of maintaining the rack teeth in engagement with the pinion 34 and also of exerting a longitudinal pull upon the rack bar so as to maintain the transverse bar or stirrup part 29 of the bell-crank lever in contact with the projection 26 at the outer end of the main lever plate 3.

The pinion spindle 35 projects above the bracket lug 38 and carries a plate 40 upon which the rotatable indicating dial 6 is fixed, as by a nut 41 (FIGURE 3).

In operation, when a person stands upon the platform the load is transmitted to and divided between the two lever plates 3, 4, which are deflected downwards against the resistance of the load springs 5. As the outer end of the main lever plate 3 thus moves downwards, the stirrup 29 of the bell-crank lever connected to the rack bar 32 is maintained in contact with, and follows the movement of, the said main lever plate 3 by reason of the pull exerted upon the rack bar by the oblique spring 39 attached to the pinion bracket. As the bell-crank lever turns, the rack bar moves longitudinally to turn the indicator dial 6 through the rack and pinion in order to show the weight beneath the window in the platform.

By adjusting the zero-setting screw 23 as above described, the dial can be readily brought to a zero reading for the no-load condition of the machine.

The platform 1 may be coupled to the base 2 by means of coiled springs 42.

Instead of the machine having a rotating dial, it may have a movable pointer co-operating with a fixed dial.

I claim:

1. A weighing machine comprising a platform, a base, two upper and lower overlapping lever plates fulcrummed on the base respectively at opposite ends thereof so as to extend one over the other, depending parts on the platform supported upon the two lever plates so that the load is divided between said plates, coiled load springs connected at their lower ends to the lower lever plate, a load-spring bracket on the upper lever plate from which the springs are suspended, an angularly-movable load indicating device, rack-and-pinion mechanism for operating said indicating device, the rack member being controlled by the movement of the lower lever plate, and a bracket mounted on the said upper lever plate for supporting the pinion and the rack.

2. A weighing machine according to claim 1 wherein the load-spring bracket is of inverted U-shape and having lower edges being secured to an end portion of the upper lever plate that is adjacent the fulcrum thereof.

3. A weighing machine according to claim 2, wherein the bracket for the rack and pinion is mounted on the free end of the upper lever, that is on the end which is remote from end portion on which the load-spring bracket is mounted.

4. A weighing machine according to claim 2, wherein the upper ends of the load springs are connected to opposite ends of a beam-like plate resting on a loose plate resting on the load-spring bracket, a vertical screw being carried by the top of said bracket and being operable upon the loose plate for raising and lowering the latter and the beam-like plate and setting the zero reading.

5. A weighing machine according to claim 2, wherein a bell-crank lever is mounted between the sides of the load-spring bracket, one arm engaging the lower lever plate and a second arm being jointed to the rack member.

References Cited in the file of this patent

UNITED STATES PATENTS

| | | |
|---|---|---|
| 2,232,830 | Sutton | Feb. 25, 1941 |
| 3,022,845 | Provi | Feb. 27, 1962 |